Feb. 2, 1954      H. OSTERBERG      2,667,811
VARIABLE LIGHT-MODIFYING DEVICE
Filed Oct. 29, 1949
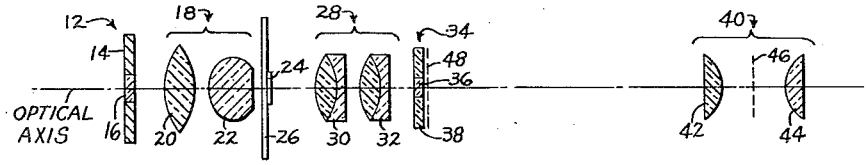
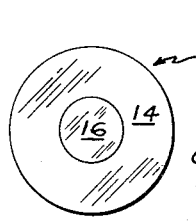
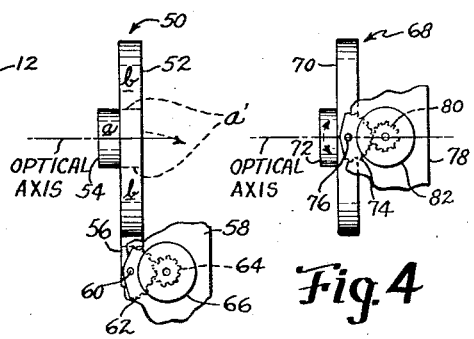
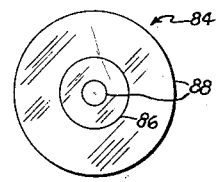
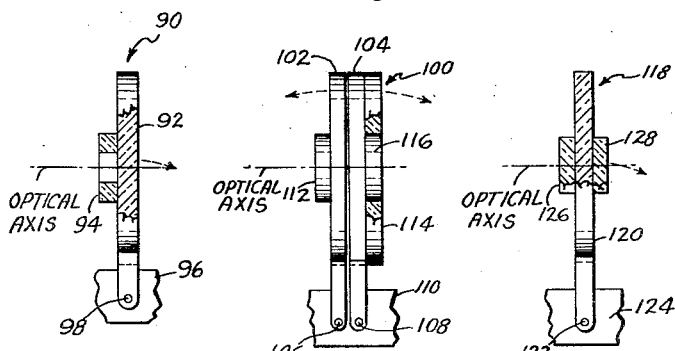
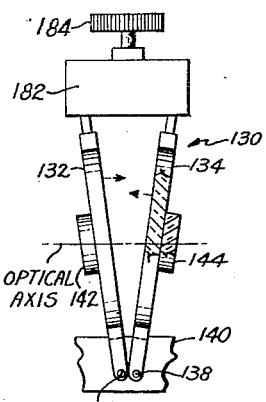
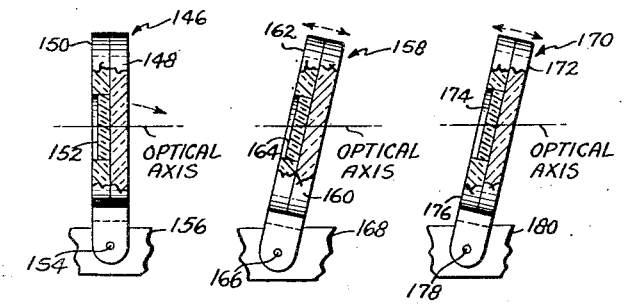
INVENTOR
HAROLD OSTERBERG
BY *Louis L. Gagnon*
*Roger S. Williams*
ATTORNEYS Patented Feb. 2, 1954

2,667,811

UNITED STATES PATENT OFFICE 2,667,811

VARIABLE LIGHT-MODIFYING DEVICE

Harold Osterberg, Springdale, Conn., assignor to American Optical Company, Southbridge, Mass., a voluntary association of Massachusetts Application October 29, 1949, Serial No. 124,404

5 Claims. (Cl. 88—39)

This invention relates to optical devices and systems for improving and progressively varying contrast effects in the images of objects. More particularly, the invention relates to such devices and systems when incorporated with a microscope, for observing structural differences in specimens which are not ordinarily clearly perceptible.

An object or specimen of a type considered herein may be regarded as constituting a plurality of particles and surrounding regions, a given particle and the adjacent surround presenting, for example, a small difference of optical path (thickness times refractive index) or a small transmission difference, or both. For clarity of explanation, a single particle and its surround and the relation and control of light rays directed upon and emanating therefrom will be considered.

Known methods of what is commonly termed "phase microscopy" involve both optical path and/or transmission differences in different regions of a specimen and the introduction of retardation or absorption components in an optical system. These components serve to modify the phase and amplitude differences existing between undeviated and deviated light rays emanating from said regions to provide desired contrast effects in a visible image of the specimen. It has been considered of advantage to effect the aforesaid modifications of phase and amplitude of the light rays in a continuous manner throughout a predetermined range so that a wide variety of contrast effects may be obtained. The present invention relates particularly to the last-named type of phase and amplitude modification and employs novel means for the purpose which are believed to possess definite advantages relating to simplicity of construction, efficiency of operation, ready adjustability, and favorable cost.

Constructions of the invention basically involve the employment of a composite angularly adjustable transparent plate-like element having generally concentric integral portions adapted to extend transversely of the optical axis of an optical system, said portions differing in thickness and/or refractive index from one another. The plate-like element is predeterminedly located in the optical system and the different portions thereof are then in position to selectively intercept undeviated and deviated light rays emerging from a specimen and to undergo differences of effective thickness when the element is rotated or tilted. Particular stress is placed herein upon constructional features which permit a unitary relation of the abutting edges of the above-mentioned concentric portions. Where said edges were not unitary as, for example, where the portions were relatively movable, the problem of light leakage therebetween might occur as well as the difficulty of providing close tolerances between minute and fragile movable parts.

Although a diaphragm is shown and described herein as a preferred means for admitting light to an optical system and for controlling the dimensions and contour of bundles of light rays, other means may be employed for a generally similar purpose. The term "light," as used herein, is not necessarily restricted to those wave lengths of radiant energy to which the human eye is sensitive but may comprise other forms of radiant energy including those in the invisible portions of the spectrum. Accordingly, any suitable primary of secondary light source may be used in the optical systems of the invention. The use of a diaphragm in the optical system provides a secondary light source and is thus considered as falling within the meaning of the term "light source." An adjustable diaphragm such as an iris diaphragm could also suitably be employed for varying the dimensions of the light aperture in the interests of improved imaging of a variety of specimens or to compensate for various types of mounting means for the same. Other types of light sources which could be positioned or effectively positioned at a location similar to that of the diaphragm shown and which are contemplated by the invention comprise an incandescent filament, a fluorescent element, a reflecting surface, or the image of a filament, of a light aperture, or of some other source of radiant energy.

An object of the invention is to provide an optical device or system wherein variable means are included for gradually modifying contrast effects in the image of an object under observation so that its structural differences may be clearly apparent.

Another object of the invention is to provide a device or system of the character described which is suitable for use in a microscope.

A further object of the invention is to provide a device or system of the character described which enables a gradual modification of phase and/or amplitude differences existing between undeviated and deviated light rays emanating from an illuminated object or specimen.

Still another object of the invention is to provide a device or system which is efficient in operation, relatively simple in construction and which fundamentally involves the angular movement of an integral plate-like element or pair of elements.

A still further object of the invention is to provide a device of the character described which avoids relatively movable adjacent surfaces transversely of the path of light and thus avoids the possibility of undesirable leakage of light between such surfaces.

These and other objects of the invention will be apparent from the following description taken in connection with the accompanying drawings wherein like reference characters refer to like parts throughout the several views of which:

Figure 1 is a diagrammatic view of an optical system forming one embodiment of the invention;

Fig. 2 is a front detail view of a diaphragm suitable for use in the optical system;

Fig. 3 is a side view of a light-modifying element of the invention;

Fig. 4 is a side view of another light-modifying device of the invention;

Fig. 5 is a front detail view of another form of diaphragm of the invention; and Figs. 6 through 12 are side views, partly in cross-section and with parts broken away, of alternative light-modifying devices of the invention.

The optical system shown in Fig. 1 generally represents a system for observing objects or speciments of the type above-described and may appropriately be incorporated with a microscope. A diaphragm 12, such as that shown in Fig. 2, having an opaque portion 14 and a clear portion or light aperture 16 of predetermined dimensions and contour is positioned adjacent an entrance pupil of the system for admitting light thereto. The diaphragm serves as a secondary light source, it being understood that an incandescent lamp or other source of light is positioned to the left of the diaphragm, but not shown, and that lens means and/or light diffusing means may be positioned between the source of light and diaphragm 12 for insuring that light of desired characteristics is incident the diaphragm. A condenser 18, comprising elements 20 and 22 directs the light rays from diaphragm aperture 16 upon an object or specimen 24 mounted upon a slide 26. An objective 28, comprising elements 30 and 32, is employed and an adjustable or variable light-modifying device 34 having a transparent zone 36 which is conjugate to diaphragm aperture 16 and a complementary transparent zone 38 is positioned adjacent the back focal plane of objective 28 or exit pupil of the system formed by said objective and condenser 18. Light from aperture 16 is normally focused upon conjugate portion or zone 36. The specific structure of the light-modifying element is omitted in Fig. 1 said element being intended to represent any of the light-modifying elements shown in detail in other of the drawings. The system of Fig. 1 is completed by an eyepiece 40 comprising, for example, elements 42 and 44 and having an image plane 46. Dotted line 48 represents a plane, contiguous element 34, at which general location various auxiliary elements, presently to be described, may be positioned.

The conjugate zone 36 and complementary zone 38 of the light-modifying devices of the invention, as represented by element 34 of Fig. 1, are formed for respectively intercepting the undeviated light rays and the deviated light rays emanating from specimen 24 and for modifying at least one of the phase and amplitude differences which may exist between said rays due to structural differences in the specimen. Basically, the light-modifying device is in the form of a transparent plate-like element having individual preferably plane parallel portions of different thickness and/or refractive index, or some other property, extending generally transversely of the optical axis. The device is rotatably or tiltably mounted so that it may be variably inclined with respect to the optical axis in a gradual manner and, accordingly may be varied in effective thickness with respect to light rays traversing the system and passing therethrough. Where the concentric portions or zones of the light-modifying device are to be employed primarily for phase modification, they may preferably be formed of glass of predetermined relative thickness and refractive index or said portions may selectively comprise dielectric substances in the form of coatings as, for example, a coating of magnesium fluoride or quartz which has been deposited on an area of a glass plate by an evaporation process. Where the portions are intended primarily for amplitude modification, they may preferably comprise a light absorbing glass or a metallic substance such as aluminum or Inconel in the form of a coating evaporated on a predetermined area of a glass plate. Accordingly, where phase and amplitude modifying areas, zones and portions are hereinafter mentioned, they may be composed of any of the aforementioned materials or of some other material adapted to perform a generally similar function, and a specific recital of the materials will not necessarily be given in each instance. The thickness of various plates, plate components and coatings, as well as the angles of inclination are greatly exaggerated in the drawings for illustrative purposes only. Actually, very thin dimensions are employed and only an extremely small angular displacement of the elements is required.

In Fig. 3 a light-modifying device 50 is shown. Said device includes a plane parallel transparent disk 52 having a centrally positioned plane parallel disk 54 bonded thereto. Disks 52 and 54 may appropriately be formed of a glass of a given refractive index and, if preferred, disk 54 may be formed as a protruding integral portion of disk 52. Disk 54 and the portion of disk 52 longitudinally aligned therewith form the conjugate zone $a$, $a'$ of device 50. Portions of disk 52 surrounding said conjugate zone form the complementary zone $b$ of the device. Any suitable means for tilting the composite device may be employed. Means illustrated for the purpose include a mounting member 56 rigidly attached to disk 52 and rotatably attached to carrying tube portions 58 by a pivot 60. A gear sector 62 is rigidly attached to pivot 60, the sector 62 being rotated by a gear 64 having a knob 66 rigidly attached thereto.

Further referring to Fig. 3 and assuming disks 52 and 54 to be plane parallel, tilting of the device 50 will produce an equal increase in effective thickness of disk 52 throughout its extent, namely, throughout its complementary portions $b$ as well as throughout its conjugate portion $a'$ so that no alteration of relative thickness between said portions will take place and, accordingly, no relative change in the wave characteristics (i. e., phase or amplitude) of the deviated and undeviated light rays traversing said portions will occur. However, the accompanying alteration in effective thickness of disk 54, forming conjugate zone $a$, is not matched by any alteration in the complementary zone. Accordingly a modification of a wave characteristic of the undeviated light rays is provided which alters the phase or amplitude relation between the undeviated light rays and the deviated light rays according to the light modifying properties of disk portion 54. Assuming, for example, that element 50 is primarily of a phase modifying type and that portion 54 is formed of a glass, tilting of element 50 from the position shown in Fig. 3 would increase the optical path through portion 54 and would produce an increasing retardation of the undeviated light rays. Accordingly, their phase relation with respect to the deviated rays transmitted by zone b would be altered. It follows that a progressive variation in interference conditions between said rays would thus be produced and would be accompanied by a gradual alteration of contrast effects in an image of the object. If element 50 is primarily of an amplitude modifying type and portion 54 is, for example, formed of a neutral light-absorbing glass, a similar tilting of element 50 would produce an increase in effective density of portion 54 and diminish its transmission properties. Accordingly, the amplitude of the undeviated light rays would be reduced, also providing an alteration of contrast effects in an image of the object.

Fig. 4 illustrates a light-modifying device 68 comprising disk portions 70 and 72 which may be considered as optically similar to device 50 of Fig. 3. However, disk 70 is mounted for rotation about an axis passing substantially through its center. A gear sector 74 is fixedly connected to an edge of disk 70 or to a mounting ring therefor, not shown, by a shaft 76. Shaft 76 is rotatably mounted in housing portion 78. The gear sector 74 is actuated by a gear 80 having a knob 82 rigidly attached thereto. The rotatable mounting of Fig. 4 permits a given degree of tilt with a minimum displacement from a plane as, for example, an image plane extending at 90° to the optical axis. Said mounting means may offer certain optical advantages where it is desired to maintain the components adjacent an image plane and may be employed relative to any of the light-modifying devices shown herein.

Fig. 5 represents a modified diaphragm 84 having an annular light aperture 86 of predetermined dimensions and opaque portions 88. Diaphragm 84 may be employed as, for example, in the system of Fig. 1 in place of diaphragm 12, where an annular bundle of light rays is preferred as a light source. A light-modifying device 90 of the type shown in Fig. 6 may appropriately be employed with diaphragm 84, said device being positioned in the system of Fig. 1 at the location of element 34. Device 90 comprises a transparent disk 92 having an annular disk 94 centrally attached thereto, it being understood that in the optical system of Fig. 1, the image of annular diaphragm aperture 86 would be focused upon the annular conjugate disk 94. The disk 92 is tiltably mounted upon fixed portions 96 of a carrying tube by a pivot pin 98. Mechanism for tilting device 90 is omitted in Fig. 6 and in the subsequent drawings inasmuch as means for the purpose such as have been shown in Figs. 3 and 4, or other suitable means, may be employed. Optical considerations relative to device 90 are similar to those applying to element 50 of Fig. 3.

In Fig. 7, a light-modifying device 100, which is a modification of that shown in Figs. 3, 4 and 6, is illustrated, said device permitting a plus or minus retardation throughout a predetermined range as, for example, through a range of plus 1λ to minus 1λ according to the thickness and refractive indices of conjugate and complementary zonal portions. Device 100 may appropriately be formed of glass and comprises a pair of transparent plate-like elements 102 and 104, pivotally mounted at 106 and 108 upon a fixed member 110. Plate 102 has a central disk-like conjugate zonal portion 112 and plate 104 includes an annular complementary zonal portion 114 enclosing a central opening 116. Portions 112 and 114 may be in the form of coatings, of the type above described, which are deposited on the respective plates. Plates 102 and 104 may suitably be of a similar thickness and refractive index and portions 112 and 114 may also be assumed to be of identical thickness and refractive index. Device 100 provides zero relative retardation between the conjugate and complementary zonal portions at the position of plates 102 and 104 shown in Fig. 7, the optical path (thickness times refractive index) through said portions being substantially identical. When plate 104 is tilted, a variable relative retardation in the complementary zonal portion 114 of said plate occurs, namely, a minus type of retardation, it being shown that no matching conjugate portion of material exists transversely thereof but merely said central opening 116. When plate 102 is tilted, a plus type of variable relative retardation in the conjugate zone is provided as described with respect to Fig. 3. Means for independently tilting plates 102 and 104 are understood to be included, although not shown. The conjugate and complementary portions of device 100 may also be formed of materials having light-absorbing properties whereby a balance of light absorption between said portions may be obtained at the position shown, or a selective absorption in either zonal portion may be achieved by tilting one or the other of the plates. It is to be understood that the devices shown in Figs. 3 and 4 could be formed similarly to plate 104 and annular portion 114 of Fig. 7, if preferred, as a relative retardation between the conjugate and complementary portions could be similarly achieved thereby.

Fig. 8 illustrates a device 118 comprising a transparent plate 120 pivotally mounted at 122 upon a fixed member 124. A dielectric or phase modifying layer 126 is deposited upon one face of plate 120 and a metallic or light-absorbing layer 128 for modifying the amplitude of light waves is deposited upon an opposite and coextensive face of said plate. Said depositions are shown in the conjugate zonal portions of the device and, accordingly, said device is of a plus relative retardation type, but they could be formed in the complementary portions if preferred. For purposes of illustration, it may be assumed that during tilting of the plate, continuously varying retardation of light rays emanating from the device occurs in the conjugate zone but that the light-absorbing deposition is so chosen as to thickness and transmission characteristics as to provide a substantially constant predetermined absorption of said light rays. The absorption properties of layer 128 are selected for functioning to the greatest advantage with the variable retardation properties of the device.

In Fig. 9, the light-modifying device 130 comprises a pair of transparent plates 132 and 134 pivotally mounted at 136 and 138 upon a fixed element 140. A phase modifying layer 142 is formed upon plate 132 and an amplitude modifying layer 144 is formed upon plate 134. Gradual modifications of phase or amplitude of incident light waves may be obtained by tilting plates 132 and 134, respectively.

Figs. 10 through 14 illustrate modifications of the devices above-described wherein variations of thickness, refractive index and absorption properties exist between layers or portions which are deposited or otherwise formed upon the conjugate and complementary zones of transparent plates. Said properties are functionally employed in conjunction with variations of effective thickness of said portions which are obtained by tilting or rotating the plates. Thus, in Fig. 10, a composite device 146 is shown comprising a transparent supporting plate or disc 148 carrying a phase modifying annular complementary layer 150 and a phase modifying central or conjugate layer 152. The relative indices of refraction of plate 148 and zonal portions 150 and 152 and the relative thicknesses of said portions are so chosen that the optical path relationship between the conjugate and complementary portions is zero at normal incidence of light waves, namely, at the position shown in Fig. 10, and departs from zero as the device is tilted bodily relative to the optical axis. Means for tilting the plate comprise a pivotal connection 154 engaging a fixed member 156, it being understood that suitable mechanism, not shown, for obtaining exact angular adjustments of the device are included.

Further relating to the device of Fig. 10, the optical paths through portions 150 and 152 will change by different amounts when said device is tilted, the degree to which each is altered depending upon the choice of refractive indices and thicknesses of each portion. Assuming zero relative retardation to exist at the position shown in Fig. 10, tilting of the device provides a plus or minus change depending upon a choice of said refractive indices and thicknesses which provides a relative retardation in the conjugate or complementary zonal portions, respectively.

The device of Fig. 10 permits a zero phase relation between the conjugate and complementary portions and either a plus or minus phase difference as above-described. Means permitting the zero relationship and both a plus or minus difference is illustrated by device 158 of Fig. 11 comprising plate 160, complementary zonal portion 162, conjugate zonal portion 164 and pivotal means 166 for attaching the device to a fixed member 168. Let it be assumed that the thickness and refractive index of plate 160 is constant throughout its extent; that the normal thickness through portion 164 in wave lengths is 1369 λ; that the refractive index of portion 164 is 1.72600; that the normal thickness through the portion 162 is 1914 λ; and that the refractive index of portion 162 is 1.51900. The phase difference Δ between light rays transmitted by each portion is zero when the angle of tilt equals 5°. When θ, the angle of tilt equals zero, the undeviated light rays are relatively retarded and the phase difference is plus .3 λ. When θ equals 7.2°, the deviated light rays are relatively retarded and the phase difference equals minus .3 λ. In an alternative construction, two individually pivotal plates of the type of Fig. 11, each carrying zonal portions of similar thickness and refractive index to those of Fig. 11, but wherein the portions on one plate are reversely positioned as to conjugate and complementary location, could be employed for obtaining a zero phase difference when the plates are parallel, a plus phase difference when one plate is tilted, and a minus phase difference when the other plate is tilted. Various other ranges of phase difference from that of the example, above given, may be achieved by providing other properties of thickness and refractive index in the zonal portions.

Fig. 12 illustrates a device 170 comprising a transparent plate 172 having a conjugate portion 174 of a given thickness and absorptivity and a complementary portion 176 of a different thickness and absorptivity. The device is pivotally mounted at 178 to a fixed member. The relative thicknesses and absorption properties of the aforesaid portions are predetermined so that at a given angle of tilt, such as that shown in Fig. 12, zero relative absorption of light rays occurs and the amplitude relation thereof is unaffected. When the device is tilted in a direction toward a plane normal to the optical axis a relative absorption of undeviated light waves incident the conjugate portion 174 occurs and the amplitude thereof is diminished. When the device is tilted in a direction so as to form a more acute angle relative to the optical axis than that shown, a relative absorption and diminution in amplitude of deviated light rays incident the complementary portion 176 takes place. Light absorbing glasses or metallic layers formed of aluminum, Inconel or the like, of different thicknesses and absorption properties may be deposited in vacuum or otherwise formed upon plate 172 for forming said portions. A differential transmission change of portions 174 and 176 when the device is tilted may also be obtained by forming a reflection coating on one or both of said portions for providing a differential reflectivity thereof according to the angle of tilt.

The various devices shown herein are to be construed as functioning most effectively in parallel light to avoid obliquity effects in the image of an object. Thus, it may be considered desirable to incorporate infinity corrected objectives in the optical system or to provide a system similar to an anastigmatizing lens system of a type employed in a petrographic microscope. The constructions of such lenses are well known and are therefore considered to be unnecessary of inclusion herein. Where nonparallel light is employed, it would be possible to utilize each of the devices shown herein in duplicate in an optical system to prevent lateral displacement of an image. Said devices could be positioned in an optical system adjacent the exit pupil of a condenser and objective thereof or could, in part, be placed at said position and in part be placed at other locations in the system by employing auxiliary lenses for establishing additional image or focal planes serving said purpose. Assuming use of the devices in duplicate, such as is indicated at 132 and 134 in Fig. 9, each of said devices would be simultaneously tilted oppositely or divergently through equal angles with respect to the optical axis and, accordingly, no lateral displacement of the image would occur. Means for accomplishing this simultaneous tilting action is indicated generally in Fig. 9 and may comprise a relatively fixed housing 182 containing suitable mechanism of known construction for moving the devices 132 and 134 oppositely when control knob 184 is rotated. It will be understood that the degree of tilt required of each device would be lessened because of the cumulative retardation or absorption properties residing in a pair of said devices.

Where the source of light is other than monochromatic as, for example, where "white" light is utilized, an achromatization plate consisting of plane parallel individual conjugate and complementary portions of different thickness and/or dispersion for selectively modifying the phase of light of predetermined wave lengths may be positioned at plane 48 of Fig. 1. Such a plate would insure that the path difference between the undeviated and deviated light rays is substantially constant for all wave lengths. Similarly formed phase modifying plates capable of introducing color in the visible image could also be positioned at plane 48 for obtaining a relatively bright region of a specimen in a given color and, simultaneously, a relatively dark region in a contrasting color. In certain cases, it may also be desirable to provide conjugate and complementary portions of the light-modifying device itself wherein differences of thickness and dispersion between said portions are employed for the above-mentioned purposes of achromatization and introduction of color in the image.

It will be apparent that other modifications of the devices and optical systems, above-described, may be made in accordance with the general principles exemplified herein. Accordingly, such examples as have been generally presented are merely illustrative and the invention may be otherwise embodied and practiced within the scope of the following claims.

I claim:

1. An optical system for obtaining uninterrupted progressively variable contrast effects in an image of an object of relatively low contrast and of the type producing deviated and undeviated light rays when positioned at a predetermined object plane in said system, said system comprising objective lens means focused substantially at said object plane, a condenser, means providing a light source of predetermined dimensions and contour adjacent said condenser and substantially at an entrance pupil of said system, said condenser and objective lens means being optically aligned with said light source and coacting to produce an image of said light source at a predetermined first image plane, plate-like light-modifying means positioned substantially at said first image plane and extending generally transversely of the optical axis of said system, said light-modifying means being pivotally mounted for movement about an axis disposed in a plane substantially at right angles to said optical axis and comprising a plurality of transparent portions in fixed relation to each other, one of said portions differing by a predetermined amount from another of said portions in at least one of the absorption and retardation characteristics thereof, said light-modifying means having said portions selectively intercepting said deviated and undeviated light rays emanating from the object when positioned at said object plane, said objective lens means imaging said deviated light rays transmitted by said light-modifying means at a predetermined image plane conjugate to said object plane, said one portion being substantially geometrically similar in shape to the contour of said light source and of such a size and so located as to substantially coincide with the image of said light source produced at said first image plane, and means for gradually tilting said light modifying means relative to said optical axis to progressively alter the effective thickness of said portions relative to the light rays passing therethrough, whereby at least one of the phase and amplitude differences existing between the deviated and undeviated light rays passing therethrough may be altered to vary the contrast effect in an image of said object at said conjugate image plane.

2. An optical system for obtaining uninterrupted progressively variable contrast effects in an image of an object of relatively low contrast and of the type producing deviated and undeviated light rays when positioned at a predetermined object plane in said system, said system comprising objective lens means focused substantially at said object plane, a condenser, means providing a light source of predetermined dimensions and contour adjacent said condenser and substantially at an entrance pupil of said system, said condenser and ojective lens means being optically aligned with said light source and coacting to produce an image of said light source at a predetermined first image plane, plate-like light-modifying means positioned substantially at said first image plane and extending generally transversely of the optical axis of said system, said light-modifying means being pivotally mounted for movement about an axis disposed in a plane substantially at right angles to said optical axis and comprising a plurality of transparent portions in fixed relation to each other, one of said portions differing by a predetermined amount from another of said portions in the optical path value thereof, said light-modifying means having said portions selectively intercepting said deviated and undeviated light rays emanating from the object when positioned at said object plane, said objective lens means imaging said deviated light rays transmitted by said light-modifying means at a predetermined image plane conjugate to said object plane, said one portion being substantially geometrically similar in shape to the contour of said light source and of such a size and so located as to substantially coincide with the image of said light source produced at said first image plane, and means for gradually tilting said light modifying means relative to said optical axis to progressively alter the effective thickness of said portions relative to the light rays passing therethrough, whereby at least one of the phase and amplitude differences existing between the deviated and undeviated light rays passing therethrough may be altered to vary the contrast effect in an image of said object at said conjugate image plane.

3. An optical system for obtaining uninterrupted progressively variable contrast effects in an image of an object of relatively low contrast and of the type producing deviated and undeviated light rays when positioned at a predetermined object plane in said system, said system comprising objective lens means focused substantially at said object plane, a condenser, means providing a light source of predetermined dimensions and contour adjacent said condenser and substantially at an entrance pupil of said system, said condenser and objective lens means being optically aligned with said light source and coacting to produce an image of said light source at a predetermined first image plane, plate-like light-modifying means positioned substantially at said first image plane and extending generally transversely of the optical axis of said system, said light-modifying means being pivotally mounted for movement about an axis disposed in a plane substantially at right angles to said optical axis and comprising a plurality of transparent portions in fixed relation to each other, one of said portions differing by a predetermined amount from another of said portions in thickness and refractive index thereof, said light-modifying means having said portions selectively intercepting said deviated and undeviated light rays emanating from the object when positioned at said object plane, said objective lens means imaging said deviated light rays transmitted by said light-modifying means at a predetermined image plane conjugate to said object plane, said one portion being substantially geometrically similar in shape to the contour of said light source and of such a size and so located as to substantially coincide with the image of said light source produced at said first image plane, and means for gradually tilting said light modifying means relative to said optical axis to progressively alter the effective thickness of said portions relative to the light rays passing therethrough, whereby at least one of the phase and amplitude differences existing between the deviated and undeviated light rays passing therethrough may be altered to vary the contrast effect in an image of said object at said conjugate image plane.

4. An optical system for obtaining uninterrupted progressively variable contrast effects in an image of an object of relatively low contrast and of the type producing deviated and undeviated light rays when positioned at a predetermined object plane in said system, said system comprising objective lens means focused substantially at said object plane, a condenser, means providing a light source of predetermined dimensions and contour adjacent said condenser and substantially at an entrance pupil of said system, said condenser and objective lens means being optically aligned with said light source and coacting to produce an image of said light source at a predetermined first image plane, plate-like light-modifying means positioned substantially at said first image plane and extending generally transversely of the optical axis of said system, said light-modifying means comprising a pair of members each pivotally mounted for movement in opposite directions about an axis disposed in a plane substantially at right angles to said optical axis and each member comprising a plurality of transparent portions in fixed relation to each other, one of said portions of each member differing by a predetermined amount from another of said portions of the same member in at least one of the absorption and retardation characteristics thereof; said members having said portions thereof selectively intercepting said deviated and undeviated light rays emanating from the object when positioned at said object plane, said objective lens means imaging said deviated light rays transmitted by said light-modifying means at a predetermined image plane conjugate to said object plane, said one portion of each member being substantially geometrically similar in shape to the contour of said light source and of such a size and so located as to substantially coincide with the image of said light source produced at said first image plane, and means for gradually tilting said members relative to said optical axis to progressively alter the effective thicknesses thereof relative to the light rays passing therethrough, whereby at least one of the phase and amplitude differences existing between the deviated and undeviated light rays passing therethrough may be altered to vary the contrast effect in an image of said object at said conjugate image plane.

5. An optical system for obtaining uninterrupted progressively variable contrast effects in an image of an object of relatively low contrast and of the type producing deviated and undeviated light rays when positioned at a predetermined object plane in said system, said system comprising objective lens means focused substantially at said object plane, a condenser, means providing a light source of predetermined dimensions and contour adjacent said condenser and substantially at an entrance pupil of said system, said condenser and objective lens means being optically aligned with said light source and coacting to produce an image of said light source at a predetermined first image plane, plate-like light-modifying means positioned substantially at said first image plane and extending generally transversely of the optical axis of said system, said light-modifying means comprising a pair of members each pivotally mounted for movement in opposite directions about an axis disposed in a plane substantially at right angles to said optical axis and each member comprising a plurality of transparent portions in fixed relation to each other, one of said portions of each member differing by a predetermined amount from another of said portions of the same member in at least one of the absorption and retardation characteristics thereof, said members having said portions thereof selectively intercepting said deviated and undeviated light rays emanating from the object when positioned at said object plane, said objective lens means imaging said deviated light rays transmitted by said light-modifying means at a predetermined image plane conjugate to said object plane, said one portion of each member being substantially geometrically similar in shape to the contour of said light source and of such a size and so located as to substantially coincide with the image of said light source produced at said first image plane, and means for gradually and simultaneously tilting said members relative to said optical axis to progressively alter the effective thicknesses thereof relative to the light rays passing therethrough, whereby at least one of the phase and amplitude differences existing between the deviated and undeviated light rays passing therethrough may be altered to vary the contrast effect in an image of said object at said conjugate image plane.

HAROLD OSTERBERG.

References Cited in the file of this patent

UNITED STATES PATENTS

| Number | Name | Date |
|---|---|---|
| 1,497,235 | Godillon | June 10, 1924 |
| 2,354,614 | Reason | July 25, 1944 |
| 2,427,689 | Osterberg et al. | Sept. 23, 1947 |

OTHER REFERENCES

Hadley et al., "Reflection and Transmission Interference Filters," article in Journal of The Optical Society of America, vol. 37, #6, June 1947, pages 451–465. Publ. American Institute of Physics, New York, N. Y. (Copy in Div. 7.)

Osterberg, "The Polanret Microscope," article in Journal of the Optical Society of America, vol. 37, #9, Sept. 1947, pages 726–729. Publ. by American Institute of Physics, New York, N. Y. (Copy in Div. 7.)